United States Patent
de Aguiar et al.

(10) Patent No.: US 9,619,914 B2
(45) Date of Patent: Apr. 11, 2017

(54) WEB PLATFORM FOR INTERACTIVE DESIGN, SYNTHESIS AND DELIVERY OF 3D CHARACTER MOTION DATA

(71) Applicant: Adobe Systems Incorporated, San Jose, CA (US)

(72) Inventors: Edilson de Aguiar, El Cerrito, CA (US); Emiliano Gambaretto, San Francisco, CA (US); Stefano Corazza, San Francisco, CA (US)

(73) Assignee: FACEBOOK, INC., San Jose, CA (US)

( * ) Notice: Subject to any disclaimer, the term of this patent is extended or adjusted under 35 U.S.C. 154(b) by 0 days.

(21) Appl. No.: 14/094,377

(22) Filed: Dec. 2, 2013

(65) Prior Publication Data

US 2014/0160116 A1    Jun. 12, 2014

Related U.S. Application Data

(63) Continuation of application No. 12/753,032, filed on Apr. 1, 2010, now abandoned, which is a (Continued)

(51) Int. Cl.
*G06T 13/20* (2011.01)
*G06T 13/40* (2011.01)

(52) U.S. Cl.
CPC ............. *G06T 13/20* (2013.01); *G06T 13/40* (2013.01); *G06T 2200/16* (2013.01)

(58) Field of Classification Search
None
See application file for complete search history.

(56) References Cited

U.S. PATENT DOCUMENTS 4,797,836 A * 1/1989 Witek ..................... G06T 13/00
                                                           345/442
6,047,078 A    4/2000 Kang
(Continued)

FOREIGN PATENT DOCUMENTS

CH    WO 0139130 A1 *  5/2001 ............. G06T 15/50
EP         1884896 A2    2/2008
(Continued)

OTHER PUBLICATIONS

Grassia, "Believable Automatically Synthesized Motion by Knowledge-Enhanced Motion Transformation", Thesis CMU-CS-00-163 in Aug. 21 2000. Due to file space, only two chapters are attached. The complete document can be downloaded at http://citeseerx.ist.psu.edu/viewdoc/download?doi=10.1.1.68.5698&rep=rep1&type=pdf.*

(Continued)

*Primary Examiner* — Yingchun He
(74) *Attorney, Agent, or Firm* — Keller Jolley Preece (57) ABSTRACT

Systems and methods are described for animating 3D characters using synthetic motion data generated by motion models in response to a high level description of a desired sequence of motion provided by an animator. In a number of embodiments, the synthetic motion data is streamed to a user device that includes a rendering engine and the user device renders an animation of a 3D character using the streamed synthetic motion data. In several embodiments, an animator can upload a custom model of a 3D character or a custom 3D character is generated by the server system in response to a high level description of a desired 3D character provided by the user and the synthetic motion data generated by the generative model is retargeted to animate the custom 3D character.

26 Claims, 4 Drawing Sheets

Related U.S. Application Data continuation-in-part of application No. 12/370,269, filed on Feb. 12, 2009, now Pat. No. 8,704,832.

(60) Provisional application No. 61/166,117, filed on Apr. 2, 2009.

(56) References Cited

U.S. PATENT DOCUMENTS

| | | | |
|---|---|---|---|
| 6,088,042 | A | 7/2000 | Handelman et al. |
| 6,278,466 | B1 | 8/2001 | Chen |
| 6,462,742 | B1* | 10/2002 | Rose ........................ G06T 13/40 345/473 |
| 6,552,729 | B1 | 4/2003 | Di Bernardo et al. |
| 6,554,706 | B2 | 4/2003 | Kim et al. |
| 6,700,586 | B1 | 3/2004 | Demers |
| 6,714,200 | B1 | 3/2004 | Talnykin et al. |
| 7,168,953 | B1 | 1/2007 | Poggio et al. |
| 7,209,139 | B1 | 4/2007 | Keet et al. |
| 7,522,165 | B2 | 4/2009 | Weaver |
| 7,937,253 | B2 | 5/2011 | Anast et al. |
| 8,749,556 | B2 | 6/2014 | De Aguiar et al. |
| 8,797,328 | B2 | 8/2014 | Corazza et al. |
| 8,928,672 | B2 | 1/2015 | Corazza et al. |
| 2002/0050988 | A1 | 5/2002 | Petrov et al. |
| 2003/0164829 | A1 | 9/2003 | Bregler et al. |
| 2003/0169907 | A1 | 9/2003 | Edwards et al. |
| 2003/0208116 | A1 | 11/2003 | Liang et al. |
| 2003/0215130 | A1 | 11/2003 | Nakamura et al. |
| 2004/0021660 | A1 | 2/2004 | Ng-Thow-Hing et al. |
| 2004/0049309 | A1 | 3/2004 | Gardner et al. |
| 2004/0210427 | A1 | 10/2004 | Marschner et al. |
| 2004/0227752 | A1 | 11/2004 | McCartha et al. |
| 2005/0264572 | A1 | 12/2005 | Anast et al. |
| 2006/0002631 | A1 | 1/2006 | Fu et al. |
| 2006/0109274 | A1 | 5/2006 | Alvarez et al. |
| 2006/0134585 | A1 | 6/2006 | Adamo-villani et al. |
| 2006/0171590 | A1 | 8/2006 | Lu et al. |
| 2006/0245618 | A1 | 11/2006 | Boregowda et al. |
| 2006/0267978 | A1 | 11/2006 | Litke et al. |
| 2007/0091085 | A1 | 4/2007 | Wang et al. |
| 2007/0104351 | A1 | 5/2007 | Yang et al. |
| 2007/0182736 | A1 | 8/2007 | Weaver |
| 2008/0024487 | A1 | 1/2008 | Isner et al. |
| 2008/0030497 | A1 | 2/2008 | Hu et al. |
| 2008/0031512 | A1* | 2/2008 | Mundermann .... G06K 9/00342 382/154 |
| 2008/0043021 | A1 | 2/2008 | Huang et al. |
| 2008/0152213 | A1 | 6/2008 | Medioni et al. |
| 2008/0158224 | A1 | 7/2008 | Wong et al. |
| 2008/0170077 | A1 | 7/2008 | Sullivan et al. |
| 2008/0180448 | A1 | 7/2008 | Anguelov et al. |
| 2008/0187246 | A1 | 8/2008 | Andres Del Valle |
| 2008/0252596 | A1 | 10/2008 | Bell et al. |
| 2009/0027337 | A1 | 1/2009 | Hildreth |
| 2009/0067730 | A1 | 3/2009 | Schneiderman |
| 2009/0195544 | A1 | 8/2009 | Wrinch |
| 2009/0196466 | A1 | 8/2009 | Capata et al. |
| 2009/0231347 | A1 | 9/2009 | Omote |
| 2010/0020073 | A1 | 1/2010 | Corazza et al. |
| 2010/0134490 | A1 | 6/2010 | Corazza et al. |
| 2010/0149179 | A1 | 6/2010 | Aguiar et al. |
| 2010/0253703 | A1 | 10/2010 | Ostermann |
| 2010/0259547 | A1 | 10/2010 | de Aguiar et al. |
| 2010/0278405 | A1 | 11/2010 | Kakadiaris et al. |
| 2010/0285877 | A1 | 11/2010 | Corazza |
| 2011/0292034 | A1 | 12/2011 | Corazza et al. |
| 2012/0019517 | A1 | 1/2012 | Corazza et al. |
| 2012/0038628 | A1 | 2/2012 | Corazza et al. |
| 2013/0021348 | A1 | 1/2013 | Corazza et al. |
| 2013/0127853 | A1 | 5/2013 | Corazza et al. |
| 2013/0215113 | A1 | 8/2013 | Corazza et al. |
| 2013/0235045 | A1 | 9/2013 | Corazza et al. |
| 2014/0204084 | A1 | 7/2014 | Corazza et al. |
| 2014/0285496 | A1 | 9/2014 | de Aguiar et al. |
| 2014/0313192 | A1 | 10/2014 | Corazza et al. |
| 2014/0313207 | A1 | 10/2014 | Taylor et al. |

FOREIGN PATENT DOCUMENTS

| | | |
|---|---|---|
| WO | 2007132451 A2 | 11/2007 |
| WO | 2009007701 A1 | 1/2009 |
| WO | 2010060113 A1 | 5/2010 |
| WO | 2010129721 A2 | 11/2010 |
| WO | 2010129721 A3 | 6/2011 |
| WO | 2011123802 A1 | 10/2011 |
| WO | 2012012753 A1 | 1/2012 |

OTHER PUBLICATIONS

Nancy S. Pollard, "Simple Machines for Scaling Human Motion", Computer Animation and Simulation '99, Eurographics Animation Workshop, p. 3-11, 1999.*

International Search Report for International Application No. PCT/US 09/57155, date completed Dec. 22, 2009, date mailed Jan. 12, 2010, 5 pgs.

International Search Report for International Application No. PCT/US 09/65825, date completed Jan. 21, 2010, date mailed Jan. 28, 2010, 3 pgs.

International Search Report for International Application PCT/US2011/045060, completed Nov. 27, 2011, 2 pgs.

International Search Report for PCT/US2010/033797, filed May 5, 2010, report completed Jun. 11, 2010, 2 pgs.

Written Opinion of the International Searching Authority for International Application No. PCT/US 09/57155, date completed Dec. 22, 2009, date mailed Jan. 12, 2010, 6 pgs.

Written Opinion of the International Searching Authority for International Application No. PCT/US 09/65825, date completed Jan. 21, 2010, date mailed Jan. 28, 2010, 6 pgs.

Written Opinion of the International Searching Authority for International Application No. PCT/US2010/033797, filed May 5, 2010, completed Jun. 11, 2010, 4 pgs.

Written Opinion of the International Searching Authority for International Application No. PCT/US2011/045060, completed Nov. 27, 2011, 5 pgs.

De Aguiar, E. et al., "Automatic Conversion of Mesh Animations into Skeleton-based Animations", Eurographics 2008, Apr. 2008.

Anguelov et al., "Recovering Articulated Object Models from 3D Range Data", In Proceedings of the 20th Conference on Uncertainty in Artificial Intelligence, pp. 18-26.

Anguelov et al., "SCAPE: Shape Completion and Animation of People", Proceedings of the SIGGRAPH Conference, 2005.

Anguelov et al., "The Correlated Correspondence Algorithm for Unsupervised Registration of Nonrigid Surfaces", Advance in Neural Information Processing Systems, 17, pp. 33-40.

Baran, et al., "Automatic rigging and animation of 3D characters", ACM Transactions on Graphics (TOG)—Proceedings of ACM SIGGRAPH 2007, vol. 26 Issue 3, Jul. 2007.

Beaudoin et al., "Adapting Wavelet Compression to Human Motion Capture Clips", GI '07 Proceedings of Graphics Interface, 2007, 6 pages.

Blanz et al., "A Morphable Model for the Synthesis of 3D Faces", In Proceedings of ACM SIGGRAPH 11999, 8 pgs.

Bray, Joseph, "Markerless Based Human Motion Capture: A Survey", Published 2001, 44 pgs.

Buenaposada et al., "Performance Driven Facial Animation Using Illumination Independent Appearance-Based Tracking", IEEE 2006, 4 pgs.

Cheung et al., "Shape-from Silhouette of Articulated Objects and its use for Human Body Kinematics Estimation and Motion Capture", In Conference on Computer Vision and Pattern Recognition (CVPR), pp. 77-84, 2003.

Curio et al., "Semantic 3D Motion Retargeting for Facial Animation", ACM 2006, 8 pgs.

Curless at al., Allen, "The Space of Human Body Shapes: Reconstruction and Parameterization from Range Scans", ACM Transactions on Graphics, 22(3), pp. 587-594.

(56) References Cited

OTHER PUBLICATIONS

Curless et al., "A Volumetric Method of Building Complex Models from Range Images", Retrieved from http://graphics.stanford.edu/papers/volrange/volrange.pdf, pp. 1-10, 1996.
Curless et al., Allen, "Articulated Body Deformation from Range Scan Data", ACM Transactions on Graphics, 21(3), 612-619.
Davis et al., "Filing Holes in Complex Surfaces Using Volumetric Diffusion", Symposium on 3 D Data Processing, Visualization, and Transmission, 2002.
De Aguiar, et al., "Marker-Less 3D Feature Tracking for Mesh-Based Human Motion Caption", Human Motion 2007, LNCS 4818, 2007, pp. 1-15.
Di Bernardo et al., "Generating Realistic Human Motions from Observations", submmitted to Fifth European Conf. on Computer Vision, ECCV 1998, pp. 1-12.
Gao et al., "Motion normalization: the preprocess of motion data", 2005, pp. 253-256.
Garland et al., "Surface Simplification Using Quadric Error Metrics", Proceedings of SIGGRAPH 1997, pp. 209-216, 1997.
Goncalves et al., Reach Out and Touch Space (Motion Learning), Automatic Face and Gesture Recognition, 1998. Proceedings. Third IEEE International Conference on Apr. 14-16, 1998, pp. 234-239.
Hahnel et al., "An Extension of the ICP Algorithm for Modeling Nonrigid Objects with Mobile Robots", Proceedings of the International Joint Conference on Artificial Intelligence (IJCAI), 2003.
Hilton et al., "From 3D Shape Capture to Animated Models", First International Symposium on 3D Processing, Visualization and Transmission (3DVPT2002).
Ju et al., "Reusable Skinning Templates Using Cage-based Deformations", ACM Transactions on Graphics (TOG)—Proceedings of ACM SIGGRAPH Asia 2008, vol. 27 Issue 5, Dec. 2008, 10 pages.
Kahler et al., "Head Shop: Generating Animated Head Models with Anatomical Structure", ACM SIGGRAPH Symposium on Computer Animation, pp. 55-64, 2002.
Lewis, "H.264/MPEG-4 AVC CABAC overview", http://www.theonlineoasis.co.uk/notes.html, Dec. 3, 2012.
Lewis et al., "Pose Space Deformation: A Unified Approach to Shape Interpolation and Skeleton-Drive Deformation", Proceedings of ACM SIGGRAPH 2000, pp. 165-172, 2000.
Liepa, P., "Filing Holes in Meshes", Proc. of the Eurographics/ACM SIGGRAPH Symposium on Geometry Processing, pp. 200-205, 2003.
Ma et al., "An Invitation to 3D Vision", Springer Verlag, pp. 15-28, 2004.
Mamou et al., "Temporal DCT-based compression of 3D dynamic meshes", ICCOM'06 Proceedings of the 10th WSEAS international conference on Communications, 2006, pp. 74-79.
Mamou et al., "The New MPEG-4/FAMC Standard for Animated 3D Mesh Compression", IEEE 3DTV-CON'08, May 2008.
Max Planck Institut Informatik, "Automatic Conversion of Mesh Animations into Skeleton-based Animations", http://www.mpiinf.mpg.de/-edeaguia/animation_eg08.html, Mar. 30, 2008, 9 pgs.
Mohr et al., "Building Efficient, Accurate Character Skins from Examples", ACM Transactions on Graphics, 22(3), pp. 562-568.
Noh et al., "Expression Cloning", Proceedings of ACM SIGGRAPH 2001, pp. 277-288, 2001.
Okada, R., et al., "A Video Motion Capture System for Interactive Games", MVA2007 IAPR Conference on Machine Vision Applications, May 16-18, 2007, Tokyo, Japan, 4 pgs.
Park et al., "On-line locomotion generation based on motion blending", ACM SIGGRAPH Symposium on Computer Animation, San Antonio, Jul. 21, 2002, 8 pages.
Park et al., "On-line motion blending for real-time locomotion generation", Computer Animation & Virtual Worlds. Wiley, UK, vol. 15, No. 3-4, Jul. 2004, 14 pages.
Popovic et al., "Style-Based Inverse Kinematics", ACM Transactions on Graphics, 23(3), pp. 522-531.
Safonova et al., "Construction and optimal search of interpolated motion graphs", ACM SIGGRAPH, 2007, 11 pgs.
Sand et al., "Continuous Capture of Skin Deformation", ACM Transactions on Graphics, 22(3), pp. 578-586, 2003.
Scholkopf et al., "A Tutorial on support Vector Regression", In Technical Report NC2-TR-1998-030. NeuroCOLT2, 1998.
Seo et al., "An Automatic Modeling of Human Bodies from Sizing Parameters", In Symposium on Interactive 3D Graphics, pp. 19-26.
Sloan et al., "Shape by Example", In 2001 Symposium on Interactive 3D Graphics, pp. 135-144, 2001.
Smola et al., "A Tutorial on Support Vector Regression", Statistics and Computing London 14(3) pp. 199-222, 2004.
Sumner et al., "Deformation Transfer for Triangle Meshes", Proceedings of ACM SIGGRAPH 2004, 23(3), pp. 399-405, 2004.
Szliski et al., "Matching 3D Anatomical Surfaces with Non-rigid Deformations Using Octree-splines", International Journal of Computer Vision, 1996, 18, 2, pp. 171-186.
Tao et al., "Mean Value Coordinates for Closed Triangular Meshes", Proceedings of ACM SIGGRAPH (2005), 6 pgs.
Taylor et al., "Modeling Human Motion Using Binary Latent Variables", Proc. of Advances in Neural Information Processing Systems (NIPS) 19, 8 pgs.
Tung et al., "Topology Matching for 3D Video Compression Computer Vision and Pattern Recognition", IEEE Conference Computer Vision and Pattern Recognition, 2007, Jun. 2007.
Vasilescu et al., "Multilinear Analysis of Image Ensembles: Tensorfaces", European Conference on Computer Vision (ECCV), pp. 447-460, 2002.
Vlasic et al., "Face Transfer with Multilinear Models", ACM Transactions on Graphics 24(3), pp. 426-433, 2005.
Vlasic et al., "Multilinear Models for Facial Synthesis", SIGGRAPH Research Sketch, 2004.
Von Luxburg, "A Tutorial on Spectral Clustering. Statistics and Computing", 2007, 32 pages.
Wang et al., "Multi-weight Enveloping: Least Squares Approximation Techniques for Skin Animation", ACM SIGGRAPH Symposium on Computer Animation, pp. 129-138, 2002.
Zhidong et al., "Control of motion in character animation", Jul. 14, 2004, pp. 841-848.
Wikipedia, "Morph target animation", Last Modified Aug. 1, 2014, Printed Jan. 16, 2015, 3 pgs.
Blanz, Volker et al., "Reanimating Faces in Images and Video", Computer graphics forum. vol. 22, No. 3. Blackwell Publishing, Inc., 2003, 10 pages.
Seitz, Steven M. et al., "A Comparison and Evaluation of Multi-View Stereo Reconstruction Algorithms", Computer Vision and Pattern Recognition, IEEE Computer Society Conference on. vol. 1. IEEE, 2006, 8 pages.
Weise, Thibaut et al., "Realtime performance-based facial animation", ACM Transactions on Graphics (TOG) 30.4 (2011): 77, 2011, 9 pages.
Anguelov et al., "The Correlated Correspondence Algorithm for Unsupervised Registration of Nonrigid Surfaces", In Conference on Computer Vision and Pattern Recognition (CVPR) pp. 77-84.
Curless et al., "A Volumetric Method of Building Complex Models from Range Images", Proceedings of SIGGRAPH 1996, pp. 302-312, 1996.
Grochow et al. "Style-Based Inverse Kinimatics." ACM 2004.
U.S. Appl. No. 12/370,269, Apr. 16, 2012, Office Action.
U.S. Appl. No. 12/370,269, Nov. 13, 2012, Office Action.
U.S. Appl. No. 12/370,269, Jul. 12, 2013, Office Action.
U.S. Appl. No. 12/370,269, Jan. 31, 2014, Notice of Allowance.
U.S. Appl. No. 12/753,032, Oct. 22, 2012, Office Action.
U.S. Appl. No. 12/753,032, May 31, 2013, Office Action.
U.S. Appl. No. 14/257,729, Sep. 11, 2015, Office Action.
U.S. Appl. No. 14/257,729, Feb. 16, 2016, Notice of Allowance.
U.S. Appl. No. 14/257,729, Mar. 2, 2016, Notice of Allowance.

* cited by examiner

WEB PLATFORM FOR INTERACTIVE DESIGN, SYNTHESIS AND DELIVERY OF 3D CHARACTER MOTION DATA

RELATED APPLICATION

The current application is a continuation of U.S. patent application Ser. No. 12/753,032 filed Apr. 1, 2010, which application was a continuation-in-part of U.S. patent application Ser. No. 12/370,269 filed Feb. 12, 2009 and claims priority to U.S. Provisional Application No. 61/166,117, filed Apr. 2, 2009 the disclosures of which are incorporated herein by reference.

FIELD OF THE INVENTION

The present invention relates generally to the generation of video animation and more specifically to the generation of animation using character motion data.

BACKGROUND

Three dimensional (3D) character animation has seen significant growth in terms of use and diffusion in the entertainment industry in the last decade. In most 3D computer animation systems, an animator defines a set of animation variables, or Avars that form a simplified representation of a 3D character's anatomy. The Avars are often organized in a hierarchical model and, therefore, the collection of Avars for a 3D character can be referred to as its hierarchical model. Motion of the 3D character can be defined by changing the values of Avars over time. The value of an Avar over time is referred to as the Avar's motion curve, and a sequence of motion can involve defining the motion curves for hundreds of Avars. The motion curves of all of a 3D character's Avars during a sequence of motion are collectively referred to as motion data.

An animator can directly animate a 3D character by manually defining the motion curves for the 3D character's Avars using an off-line software tool. Motion capture of a human or animal during a desired sequence of motion can also be used to generate motion data. Motion capture is a term used to describe a process of recording movement and translating the movement onto a digital model. A 3D character can be animated using the motion capture process to record the movement of points on the human or animal that correspond to the Avars of the 3D character during the motion. Motion capture has traditionally been performed by applying markers to the human or animal that can be mapped or retargeted to the Avars of the 3D character. However, markerless techniques have recently been developed that enable the animation of 3D characters using mesh based techniques. Markerless motion capture using mesh based techniques is described in U.S. Patent Publication No. 2008/0031512 entitled "Markerless Motion Capture System" to Mundermann, Corazza and Andriacchi, the disclosure of which is incorporated by reference herein in its entirety.

Animating a 3D character manually or using motion capture can be time consuming and cumbersome. As discussed above, the manual definition of a character's motion can involve a laborious process of defining and modifying hundreds of motion curves until a desired motion sequence is obtained. Motion capture requires the use of complex equipment and actors. In the event that the captured motion is not exactly as desired, the animator is faced with the choice of repeating the motion capture process, which increases cost, or attempting to manually edit the motion curves until the desired motion is obtained, which is difficult. The inability of animators to rapidly and inexpensively obtain complex motion data for a 3D character can represent a bottleneck for the generation of 3D animations.

SUMMARY OF THE INVENTION

Systems and methods in accordance with embodiments of the invention are described for animating 3D characters using synthetic motion data generated by motion models which use pre-defined character motion data to generate new motion data leveraging analogies between the pre-defined motions and combining together one or more of them. The motion data is generated in response to a high level description of a desired sequence of motion provided by an animator. In a number of embodiments, the motion data is generated on a shared server system that utilizes the ability of motion models to generate synthetic motion data across a continuum to enable multiple animators to effectively reuse the same set of previously recorded motion capture data to produce a wide variety of desired animation sequences. In several embodiments, an animator can upload a custom model of a 3D character to the server and the synthetic motion data generated by the generative model is retargeted to animate the custom 3D character. In many embodiments, the synthetic motion data is streamed to a rendering engine located on the animator's local computer. In this way, the processing overhead associated with rendering animations of 3D characters using synthetic motion generated by the shared server can be distributed across a number of local computers.

One embodiment includes a server system connected to a communication network and configured to communicate with a user device that is also connected to the communication network. In addition, the server system is configured to generate a user interface that is accessible via the communication network, the server system is configured to receive a high level description of a desired sequence of motion via the user interface, the server system is configured to generate synthetic motion data using at least one motion model resident on the server system based on the high level description of the desired sequence of motion received via the user interface, the server system is configured to stream the synthetic motion data to a rendering engine on the user device, and the user device is configured to render a 3D character animated using the streamed synthetic motion data.

In a further embodiment, the server system comprises an application server and a web server that are configured to communicate, the application server is configured to communicate with a database of motion data, the web server is connected to the communication network, the application server is configured to generate the at least one motion model using the motion data and provide the at least one motion model to the web server, the web server is configured to generate the user interface that is accessible via the communication network, the web server is configured to receive the high level description of the desired sequence of motion via the user interface, the web server is configured to use the at least one motion model to generate synthetic motion data based on the high level description of the desired sequence of motion, and the web server is configured to stream the synthetic motion data to a rendering engine on the user device.

In another embodiment, the motion data includes actual motion data obtained via motion capture.

In a still further embodiment, the motion data is obtained via marker based motion capture.

In still another embodiment, the motion data includes meshes obtained using markerless motion capture.

In a yet further embodiment, the motion data includes manually generated motion data.

In yet another embodiment, the web server is configured to generate synthetic motion by determining a time base based on the high level description of the desired sequence of motion, normalizing a number of different motions to the time base, determining weightings for each of the motions based on the high level description of the desired sequence of motion, and interpolating the normalized motions using the determined weightings.

In a further embodiment again, the synthetic motion data is based upon a standard model for a 3D character, the server system is configured to receive a model of a 3D character from the user device via the communication network, the server system is configured to retarget the synthetic motion data to the received model of a 3D character, and the synthetic motion data streamed by the server system is the retargeted synthetic motion data.

In another embodiment again, the motion data is based upon a standard model for a 3D character, the server system is configured to generate a model of a 3D character from a high level description of a 3D character received via the user interface, the server system is configured to retarget the synthetic motion data to the generated model of a 3D character, and the synthetic motion data streamed by the server system is the retargeted synthetic motion data.

In a further additional embodiment, the server system is configured to impose environmental constraints on the synthetic motion data.

In another additional embodiment, the server system is configured to modify the synthetic motion data to constrain a certain aspect of the motion to occur during a particular period of the time base.

In a still yet further embodiment, the server system is configured to modify the synthetic motion data to prevent portions of the 3D character from penetrating a floor during the motion.

In still yet another embodiment, the server system is configured to use the motion model to generate synthetic motion data from any description within the continuum of the scale of the high level characteristic.

In a still further embodiment again, the high level description of the desired sequence of motion includes at least a motion type, a trajectory for the motion, and at least one motion styling.

In still another further embodiment again, the motion styling is a description of a physical characteristic or an expressive characteristic of the motion.

In a still further additional embodiment, the motion system is expressed as one of a number of discrete types of motion.

In still another additional embodiment, the trajectory of the motion is specified including at least a start point and an end point.

In a yet further embodiment again, the motion styling is expressed using at least one value from a continuous scale that corresponds to a high level characteristic that was used to describe differences between repeated sequences of motion in the motion data used to generate the motion models.

In yet another embodiment again, the server system is configured to receive an updated high level description of the desired sequence of motion over the communication network via the user interface, the server system is configured to use the motion model to generate a second set of synthetic motion data based on the updated high level description of the desired sequence of motion, and the server system is configured to stream the second set of synthetic motion data to a rendering engine on the user device.

In a yet further additional embodiment, the rendering engine is a plug-in to a browser application on the user device that is used to interact with the user interface generated by the server system.

In yet another additional embodiment, the motion data is based upon a standard model for a 3D character, the server system is configured to receive a model of a 3D character from the user device via the communication network, the server system is configured to retarget the synthetic motion data generated by the motion model based upon the high level description of the desired sequence of motion to animate the 3D character received from the user device, and the synthetic motion data streamed by the server system is the retargeted synthetic motion data.

In a further additional embodiment again, the motion data is based upon a standard model for a 3D character, the server system is configured to generate a model of a 3D character from a high level description of a 3D character received via the user interface, the server system is configured to retarget the synthetic motion data generated by the motion model based upon the high level description of the desired sequence of motion to animate the 3D character generated by the server system, and the synthetic motion data streamed by the server system is the retargeted synthetic motion data.

An embodiment of the method of the invention includes receiving a high level description of the motion characteristics for a desired motion sequence from a user device via a user interface generated by a server system, generating synthetic motion data using the server system based upon the at least one motion model and the high level description of the motion characteristics for a desired motion sequence, streaming the synthetic motion data from the server system to the user device, and rendering an animation of a 3D character using the client device based upon the streamed synthetic motion data.

In a further embodiment of the method of the invention generating synthetic motion data based upon the at least one motion model and the high level description of the motion characteristics for a desired motion sequence further includes determining a time base based on the high level description of the motion characteristics for a desired motion, normalizing the motion data of a number of different motions included in the at least one motion model to the time base, determining weightings for the motion data of each of the motions based on the high level description of the motion characteristics for a desired motion, and interpolating the normalized motion data using the determined weightings to generate synthetic motion data.

Another embodiment of the method of the invention also includes obtaining a custom model of a 3D character, and retargeting the synthetic motion data to the user model prior to streaming the synthetic motion data to the user device.

In a still further embodiment of the method of the invention the custom model of a 3D character is uploaded to the server system from the user device.

In a yet further embodiment of the method of the invention the custom model of a 3D character is generated by the server system in response to a high level description of the 3D character obtained from the user device via a user interface generated by the server system.

Yet another embodiment of the invention also includes imposing environmental constraints on the retargeted synthetic motion data.

DETAILED DESCRIPTION OF THE INVENTION

Turning now to the drawings, animation systems and methods for real time interactive generation of synthetic motion data for the animation of 3D characters are illustrated. The term synthetic motion data describes motion data that is generated by a machine. Synthetic motion data is distinct from manually generated motion data, where a human animator defines the motion curve of each Avar, and actual motion data obtained via motion capture. Animation systems in accordance with many embodiments of the invention are configured to obtain a high level description of a desired motion sequence from an animator and use the high level description to generate synthetic motion data corresponding to the desired motion sequence. Instead of directly editing the motion data, the animator can edit the high level description until synthetic motion data is generated that meets the animator's needs.

In a number of embodiments, the animation system distributes processing between a user's computer and one or more remote servers. The user can upload a custom 3D character to a server and provide a high level description of a desired motion sequence to the server via a web based user interface. In several embodiments, the server is configured to generate synthetic motion data based upon the high level description of the desired motion sequence provided by the user using one of a number of motion models that the server can retarget to the uploaded 3D character. The motion data can then be streamed to software resident on the user's computer, which can render an animation of the 3D character using the motion data. In this way, a single set of motion models and retargeting software can be shared amongst different users without the servers bearing the processing burden of rendering each 3D animation using the generated synthetic motion data. The processing burden of rendering the 3D animations is instead borne by the users' computers.

Animation System

Figure 1:
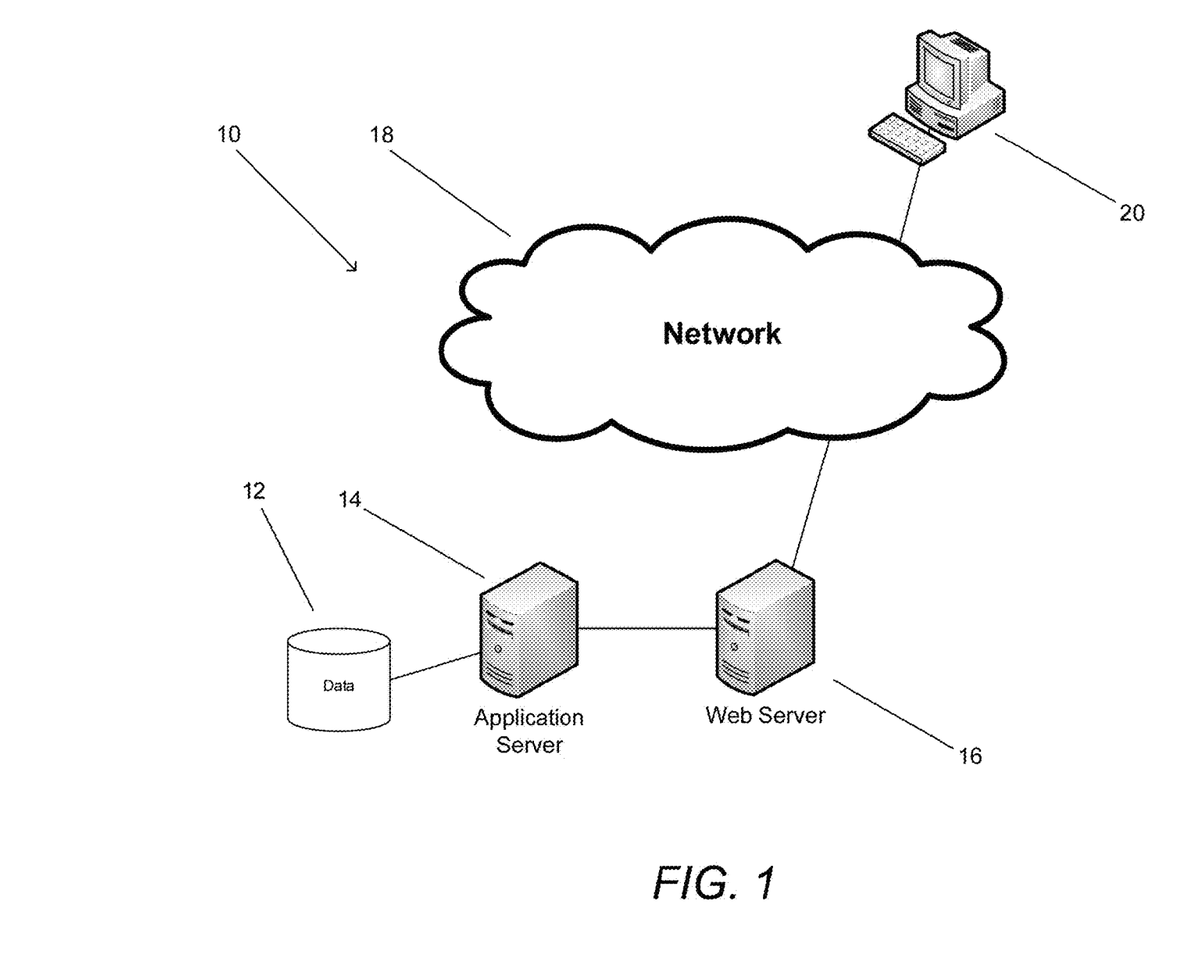
FIG. 1 is a semi-schematic diagram of an animation system configured to generate synthetic motion data in accordance with an embodiment of the invention.

An animation system that can generate synthetic motion data in accordance with an embodiment of the invention is shown in FIG. 1. The animation system 10 includes a storage device 12 connected to a server system, which in the illustrated embodiment includes an application server 14 connected to a web server 16. The web server is connected to the Internet 18 and a number of user devices 20 can access the web server via the Internet using a browser application.

The storage device contains motion data that is used by the application server to create one or more motion models. A motion model is a model that can generate synthetic motion data corresponding to a high level description of desired motion characteristics. A variety of techniques can be used to construct motion models from the motion capture training data including but not limited to: motion blending models; motion graphs; combining a finite number of pre-defined motions; time-warping algorithms; genetic algorithms or any other algorithm suitable for the optimal combination of pre-defined motions; stochastic motion blending models, which provide uniqueness and variability to the generated data; extended motion modes, which represent mathematically calculated extensions of pre-defined motions; and generative models. In a number of embodiments, the motion models are built by blending, interpolating, extrapolating, generalizing, linearly or non-linearly combining, and/or transforming what is called a motion data grid. A motion data grid is an abstraction defining a set of motions which are covering through a discrete grid the space of all, or part of the, possible combinations of the high-level descriptors of the motion defined by the user. The motion models enable the creation of synthetic motion that is similar or identical to the observed motion in the training set data, new arbitrary motions derived from the training data, or new motions that are generated by combining user interactive input with the pre-defined motion data.

In one embodiment, the motion models involve generating synthetic motion data by interpolating linearly or non-linearly time warped motion capture data. These motion models are constructed by capturing a number of related motions that form the basis of the model and then manually labeling each motion according to different high level characteristics such as, but not limited to, speed (e.g., quick/slow), emotion (e.g., aggressive/tired), and/or direction (e.g., high/medium/low). In many embodiments, the high level description includes one or more values representing different characteristics of the motion. In several embodiments, each value is selected on a continuous scale and the continuous scale can be used by motion models to generate motion data elsewhere on the scale that is a blend of the observed motion data. In addition to using labels to provide a high level description of each motion, salient points of the motion are identified. The salient points are used in time warping processes to normalize each motion with respect to the other motions used in the motion model.

The steps described above can be illustrated by way of an example. A motion model can be generated for "punches". Different punches could be labeled with characteristics such as the height of the punch (e.g., face, stomach, knee), and the level of fatigue (e.g., sharp/quick, slow/tired). The labels are typically assigned using a numerical value on a predetermined scale. The high level description can also include the length of the wind up to the punch (e.g., no wind up to a long wind up). The salient features of the punches can then be marked such as the starting point, the end of the windup, the strike, and the recoil. When a punch has no recoil, essentially the initial point of the motion is marked as two salient points (i.e., the beginning and the end of the windup). The marking of salient features can be manual or automatic using points at which the velocity of different Avars or groups of Avars pass through zero (i.e., change direction) to determine the salient points. In many embodiments, processes that use different criterion to automatically identify salient points are used.

Once the motion data has been labeled and the salient points marked in the manner described above, a motion model in accordance with embodiments of the invention can combine the motion data from several motions to generate synthetic motion data in accordance with a high level description of a desired motion. In several embodiments, the high level description can include one or more values, where each value specifies the magnitude of a particular characteristic within a continuous scale. The basic process of combining the motions involves using the high level description of the desired motion to determine a time base for each of the different portions of motion bounded by the salient points. Each motion that is combined by the motion model is then normalized to the time base for the desired motion. In its simplest form, the normalization can be thought of as a piecewise linear time warping, where each linear section corresponds to a portion of the motion bounded by the salient points. In many embodiments, a nonlinear time warping is applied to normalize each motion to provide smooth transitions between each portion of the motion bounded by the salient points. The high level description then provides information concerning the weightings that are applied to each of the normalized motions to produce the desired synthetic motion data. In a number of embodiments, a quaternion layer interpolation involving the combination of n different motions is used to combine the normalized motions. In circumstances where a user has uploaded or generated a custom 3D character model, the synthetic motion data is retargeted to the custom 3D character model. Finally, environmental constraints can be imposed on the synthetic motion data such as marking were feet should plant during the motion and imposing constraints such as preventing the 3D character's limbs from stepping "through" the floor.

The generation of synthetic motion data using the process described above can be illustrated by way of example. A variety of "punching" motions can form the basis of a motion model. At one extreme, the motion includes a punching motion with a 20 frame windup and at the other extreme a punching motion with no wind up. A user interface can be provided allowing the user to define the extent of the windup desired (e.g., a slider) and the user could indicate a desire for a punch with a windup half way between the two extremes. The motion model would then choose a time base including 10 frames reserved for the windup (i.e., half the number between 20 and 0 frames). The windup of each punching motion would then be normalized with respect to the new time base and then the two motions interpolated. Due to the fact that one of the motions involves only one static frame (no windup motion), the interpolation provides an averaging effect between the full range of the windup and stationary motion. Therefore, the range of the windup motion is approximately half that of the "full" windup.

Another category of motion model that can be utilized by an animation system in accordance with embodiments of the invention is statistical models of motion that are trained using supervised learning. Supervised learning involves training a statistical model using motion data for a number of sequences of motion, which can be referred to as training sequences. The training is supervised, because each training sequence is described using a high level description. In this way, the statistical model builds relationships between high-level descriptions and actual motion data. Once a generative model has been created, synthetic motion data can be generated by providing the generative model with a high level description indicative of a desired sequence of motion. In a number of embodiments, the high level description represents one or more expressive characteristics of the motion as values on a continuous scale and, when provided with a sufficient number of training sequences from throughout the scale, the generative model can produce synthetic motion data anywhere on the continuum and that is potentially unlike any of the motion sequences observed during training.

In several embodiments, supervised learning is used to train a Continuous Restricted Boltzmann Machine (CRBM) that can then be used as a generative model. Training of a CRBM using motion data is an extension of the method described in the conference paper by Taylor et al. entitled "modeling Human Motion Using Binary Latent Variables" presented at the Twentieth Annual Conference on Neural Information Processing Systems in Whistler, Canada (available at http://www.cs.toronto.edu/~gwtaylor/), the disclosure of which is incorporated by reference herein in its entirety. In other embodiments, any of a variety of statistical models that can be trained using supervised learning to form a generative model, which can generate synthetic motion data from a high level description of desired motion can be used.

Although any of a variety of motion models can be utilized in accordance with embodiments of the invention to generate synthetic motion data based upon a high level description of a desired motion including but not limited to the motion models described above, the performance of motion models utilized in accordance with embodiments of the invention in generating desired synthetic motion data is typically improved by using motion data during training that includes multiple repetitions of the same sequence of motion and by accurately assigning the high level characteristics that explain the differences between each repetition. Furthermore, loading the motion models into the memory (i.e., RAM) of the servers can also significantly improve the performance of the animation system. The size of the motion models is such that a large amount of memory is required. Repeatedly loading motion models from hard disk drives into memory as they are required to process user requests to generate synthetic motion data, however, would introduce significant latency into the system. Therefore, building a single set of servers in which the motion models can reside in the RAM of the servers and be shared by hundreds, thousands, or more animators can be significantly more efficient than requiring each animator have enough memory on a local machine to store the motion models for each motion. In addition, the amount of RAM required continuously increases as ideally new motion models are added to the animation system continuously.

High Level Descriptions of Motion

A high level description of motion can take any of a number of different forms appropriate to the application. In many embodiments, each training sequence is described using a common set of arbitrary characteristics. The arbitrary characteristics can relate to any aspect of the motion from a simple descriptor of the type of motion (e.g., running or walking) to a complex expressive quality of the motion (e.g., happiness, tiredness, urgency, or intoxication). The term expressive quality is used herein to describe aspects of motion that communicate information about a character and/or the character's state of being. When a motion model is generated using a sufficiently large number of training sequences labeled to reflect the expressive qualities of the training sequences, the generative model can be used to generate synthetic motion data possessing specific expressive qualities. In a number of embodiments, simple characteristics of motion such as a type of motion are expressed by labeling each training sequence with one of a number of discrete values. In several embodiments, complex characteristics of motion such as the extent of a specific expressive quality (i.e., the extent to which the motion conveys a particular idea or emotion) or a physical characteristic of the motion (e.g., walking speed, height and/or distance of a jump) are expressed by assigning each training sequence with a score on a continuous scale. When a high level characteristic is expressed on a continuous scale, the motion model can be used to generate synthetic motion data anywhere on the continuum.

Generation of Synthetic Motion Data

Once a motion model has been trained, the application server deploys the motion model to the web server, which can use the motion model to create synthetic motion data from a high level description. In the illustrated embodiment, the web server creates a web based user interface that can be accessed via a user device configured with an appropriate browser application. The web based user interface enables an animator to provide a high level description of desired motion, which is typically in terms of the arbitrary characteristics used in the training of the motion model. The web server uses the high level description to generate synthetic motion data in real time that can animate a 3D character. The 3D character can be resident on the server, generated by the server from a high level description in accordance with the process described in U.S. patent application Ser. No. 12/625,553 to Corazza et al. entitled "Real Time Generation of Animation-Ready 3D Character Models" filed Nov. 24, 2009, the disclosure of which is incorporated by reference herein in its entirety, or uploaded to the server from the user's computer. When a generated or uploaded 3D character model is animated, the synthetic motion data is retargeted to the 3D character model. In many embodiments, the synthetic motion data is streamed to the animator's browser in real time and the browser includes a rendering engine plug-in that renders the animation of the 3D character using the synthetic motion data. The animator can review the rendered animation to determine whether the synthetic motion data produces a desired animation sequence. In the event that the animator wishes to edit the sequence of motion, the animator can modify the high level description originally provided to the web server via the user interface and the application server can generate a new set of synthetic motion data in response to the new high level description, retarget the motion data (if necessary), and stream the new synthetic motion data to the user's browser for rendering. The editing process is analogous to providing modified directions to an actor and reshooting a motion capture sequence. However, the use of a generative model can eliminate the need for an actor and motion capture equipment during the editing process. Use of a generative model can also provide the animator with greater control over the final motion data.

In many embodiments, the motion data (e.g., curves and/or joint angles) are compressed for streaming to the user device. Although, the system is described above with reference to a browser plug-in, the motion data could be streamed to a variety of client applications including a video game, a browser plug-in, or a third party software application.

Provision of a motion model in a distributed architecture in accordance with embodiments of the invention enables efficient use of motion capture data. Instead of each animator separately performing motion capture for each 3D character, a large bank of motion capture data can be built over time and then the same motion capture data can be used by multiple animators via motion models. Despite the likelihood that the bank of motion capture data does not contain the specific sequence of motion desired by the animator, the motion model enables the generation of synthetic motion data matching the high level description of the desired motion provided by the animator and unlike any sequence in the bank of motion capture data. Therefore, much of the efficiency is obtained by providing multiple animators with access to the same system for generating synthetic motion and by providing a system that is capable of generating synthetic motion and not simply retrieving motion sequences from a library. Furthermore, placing the processing burden associated with rendering 3D animations on each user's local computer significantly reduces the number of application servers required to support the creation of a large number of 3D animations using the system.

Although a specific architecture is shown in FIG. 1, a number of animation systems in accordance with embodiments of the invention are implemented using a single server, using additional servers, as off-line software packages that include one or more previously trained motion models and/or provide the ability to download one or more motion models. In addition, the functions performed by different aspects of the system can vary. For example, embodiments of the invention could utilize a web server that generates a user interface and performs the generation of synthetic motion data using a motion model. Furthermore, the specific architecture shown in FIG. 1 is not essential to the delivery of motion data to a remote user. In a number of embodiments, the animation system is implemented using any of a variety of architectures for providing remote access to a system capable of generating synthetic motion data using a motion model including an architecture based around the use of cloud computing.

Generating Synthetic Motion Using a Motion Model

Figure 2:
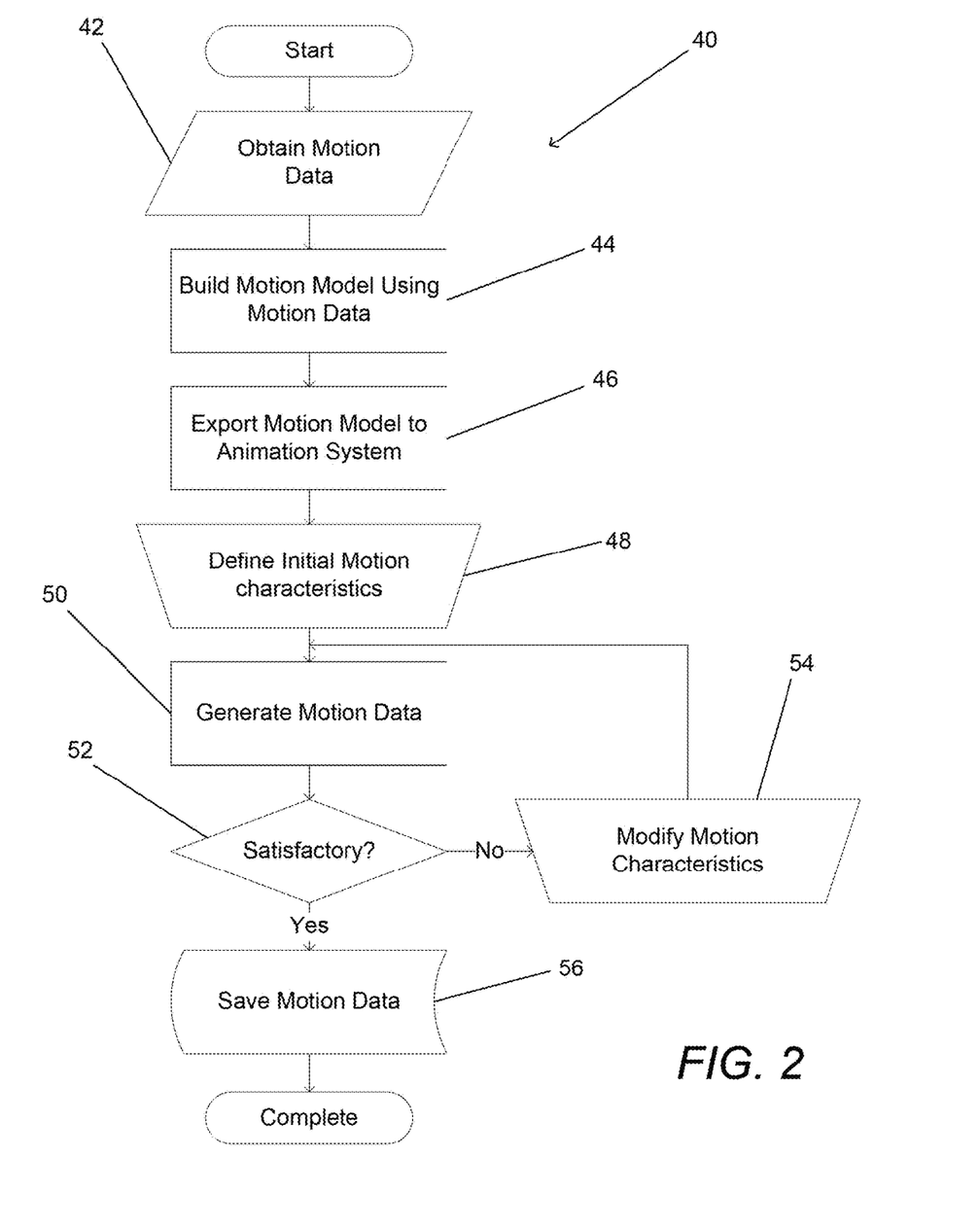
FIG. 2 is a flow chart illustrating a process for generating synthetic motion data in accordance with an embodiment of the invention.

Processes for generating synthetic motion data for animating a 3D character using a motion model in accordance with an embodiment of the invention is shown in FIG. 2. The process 40 includes obtaining (42) motion data to use in the building of a motion model. The motion data can be actual motion data obtained via motion capture (either marker based or markerless), or can be synthetic motion created manually by an animator using a conventional off-line animation software application. For the motion data to be used in the training of the motion model, each sequence of motion data is described using a set of high level characteristics appropriate to the application. The motion data is then used to build (44) a motion model. As discussed above, any model appropriate to the application that is capable of generating synthetic motion data from a high level description of a desired motion sequence can be used. In a number of embodiments, the motion model uses a combination of interpolation and linear or non-linear time warping of motion capture data to generate synthetic motion data. In several embodiments, the motion model is a statistical model trained using supervised learning. The motion models are then loaded into fast storage on a server. An initial set of high level motion characteristics is then defined (48) by an animator (typically via a web interface) and the motion model generates (50) synthetic motion data based upon the high level motion characteristics. The motion data is streamed to a rendering engine located on an animator's local computer so that an animator can make a determination (52) concerning whether the synthetic motion data is satisfactory. In the event that the synthetic motion data does not animate the 3D character in the manner desired by the animator, the high level description of the desired motion can be modified (54) and the modified description used by the motion model to generate new synthetic motion data.

When the animator is satisfied with the manner in which the generated synthetic motion data animates the 3D character, the synthetic motion data can be downloaded for storage by the animator and/or stored in a user account.

Although a specific process for generating synthetic motion data in accordance with an embodiment of the invention is illustrated in FIG. 2, other embodiments that enable the editing of a high level description of desired motion in order to produce synthetic motion data can also be used.

Building an Animation Sequence

Animation systems in accordance with embodiments of the invention support the animation of user defined models of 3D characters (User Model). The animation typically involves building a motion model using a first model, a so-called Standard Model, and then determining how the Standard Model maps to a User Model. When hierarchical models are used as both the Standard Model and the User Model, the mapping includes determining the relationships between Avars in each hierarchical model. In this way, variations in the proportions and shape of a User Model compared to a Standard Model used during the generation of the motion model can be accommodated without the need to train a new motion model using the User Model for which training sequences may not be available.

Figure 3:
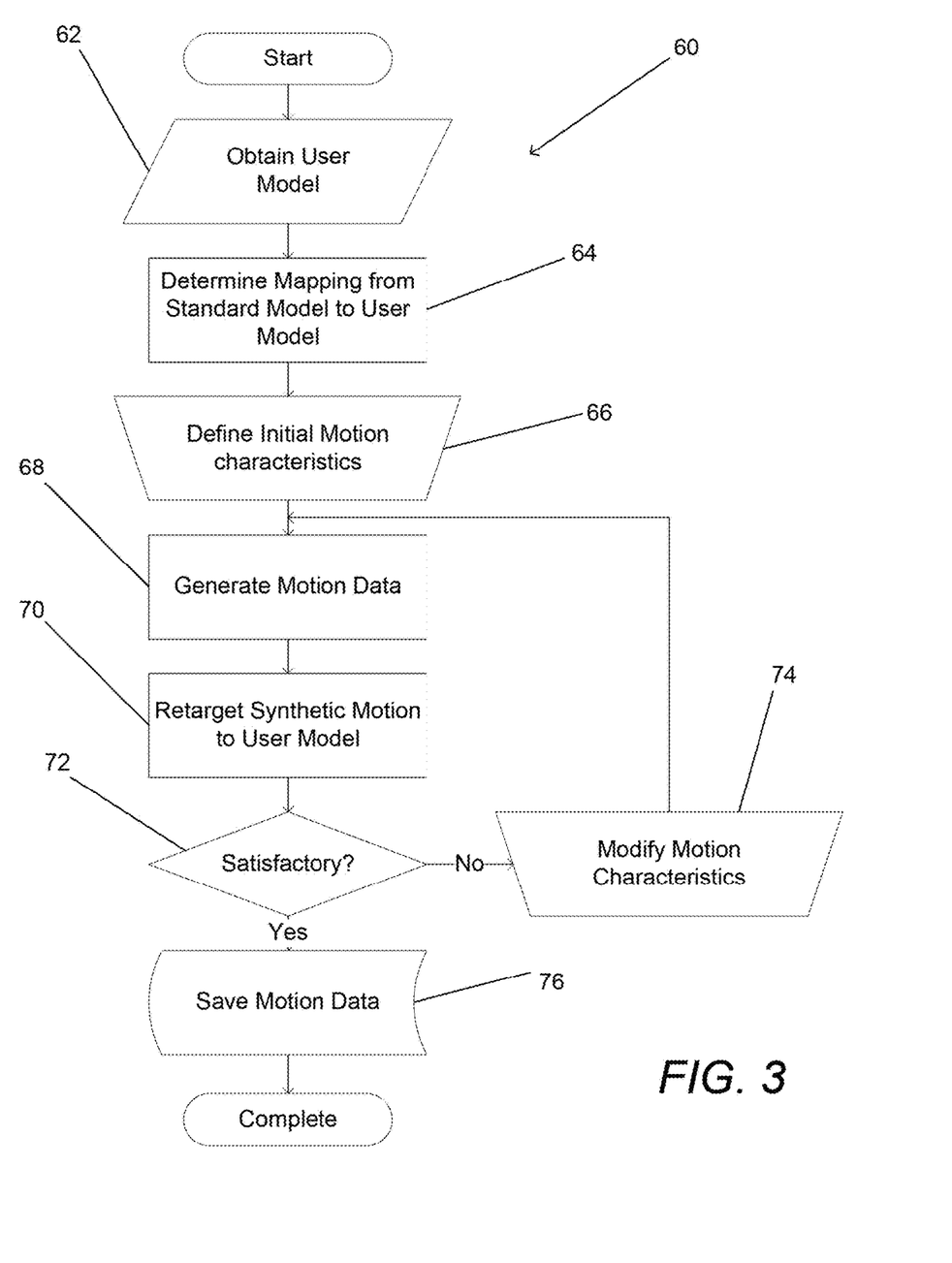
FIG. 3 is a flow chart illustrating a process for generating synthetic motion data and retargeting the data to animate a user defined 3D character in accordance with an embodiment of the invention.

A process for generating synthetic motion data to animate a user defined 3D character in accordance with an embodiment of the invention is illustrated in FIG. 3. The process 60 includes obtaining (62) a User Model. In web based systems, the User Model can be uploaded to a web server in a standard file format or a custom 3D model can be automatically generated in response to a high level description provided by an animator. Once the User Model is obtained, the User Model can be compared to the Standard Model used in the generation of the motion model. Through careful comparison, mappings of the motion data of the Standard Model to the User Model can be determined. The animator can then provide (66) an initial high level description of a motion sequence, which the motion model can use to generate synthetic motion data. The motion model generates motion data suitable for animation the Standard Model. A retargeting process is applied to the synthetic motion data to provide synthetic motion data that is suitable for animating the User Model. In many embodiments, the animation is displayed to the animator in real time by streaming the synthetic motion data via the Internet to a rendering engine on the animator's computer. The animator can determined (72) whether additional modifications (74) to the high level description are required to obtain the desired motion or whether to save (76) the final motion data.

Although a specific process is illustrated in FIG. 3, other processes in accordance with embodiments of the invention can be used that enable the retargeting of synthetic motion data generated by a generative model to animate a User Model.

Specifying Desired Motion

Figure 4:
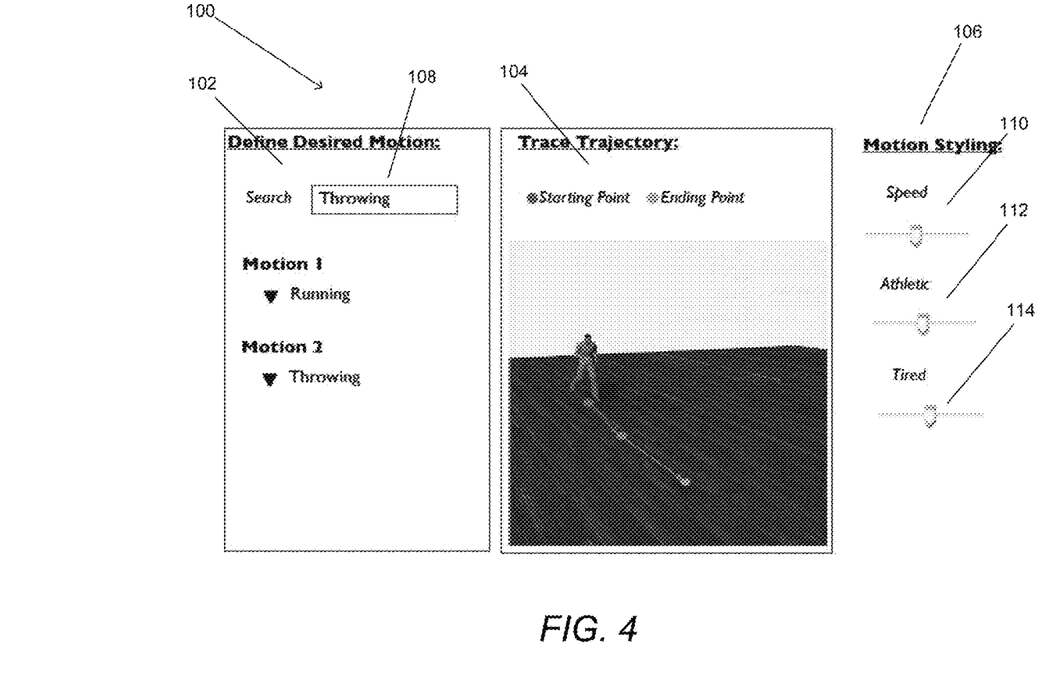
FIG. 4 is a conceptual illustration of a user interface for obtaining a high level description of a desired sequence of motion in accordance with an embodiment of the invention.

Once a model for a 3D character has been selected (either a User Model or the Standard Model), systems in accordance with embodiments of the invention enable the animation of the model of the 3D character using a high level description of the desired motion. As discussed above, a variety of characteristics of the motion including the physical characteristics of the motion and the expressive characteristics of the motion can be controlled via a user interface. A user interface that can be used to obtain a high level description of a sequence of motion from an animator in accordance with an embodiment of the invention is shown in FIG. 4. The conceptual illustration of the user interface 100 includes three different panels that enable the definition of the motion in three stages. The first panel 102 enables the user to define a sequence of discrete types of motion. In the illustrated embodiment, the sequence involves "running" followed by "throwing". The specific motions can be selected using any of a variety of common techniques for building user interfaces. For example, a user can select options from a pull down list or search for a specific motion by entering a search term in a dialog box 108. In a number of embodiments, a single generative model is capable of multiple different types of motion by providing the type of motion to the generative model. In several embodiments, a different generative model is used to generate synthetic motion data for each type of motion. In many embodiments, additional generative models are used to generate motion data for the transitions between different types of motion. The second panel 104 enables the user to define the trajectory of each different specified type of motion. Where appropriate, a number of embodiments of the invention enable the animator to specify a landscape. The animator can then define the starting point and the ending point of each type of motion. In a number of embodiments, the animator can also define the transition. In the illustrated embodiment, the user interface enables the definition of the starting and end points of each motion using a drag and drop interface. The third panel 106 enables the definition of additional physical and/or expressive characteristics of the motion, which can also be referred to as the motion styling. In the illustrated embodiment, the user interface includes three sliders that enable the description of the desired speed of the motion (110), a description of the athleticism to be expressed by the motion of the 3D character (112), and a description of the level of fatigue to be expressed by the motion of the 3D character (114). In other embodiments, any of a variety of high level characteristics specified during the training of the generative model can be controlled via the user interface. Once the animator has completed describing the characteristics of the motion using the user interface, the animation system uses one or more motion models to generate synthetic motion data corresponding to the described motions and transitions between the described motions. In the illustrated embodiment, the animation of the 3D character using the synthetic motion data is presented in the second panel 104 in the user interface. The animation of the 3D character is performed locally using a rendering engine located on the animator's computer using synthetic motion data streamed from an application server. The animator can review the animation, modify the sequence of motions, the transition between the motions, the trajectory of each motion and/or the lengths of transitions and modify the values of the styling characteristics until the sequence is satisfactory. At which point, the animator can obtain the synthetic motion data in a standard format.

Although a specific user interface is illustrated in FIG. 4, any user interface that enables the specification of the trajectory and styling of motion can be used in accordance with embodiments of the invention to obtain a high level description of desired motion from an animator.

Improving the Quality of Synthetic Character Motion Data

In a number of embodiments, synthetic motion data including motion curves and joint angles can be improved by applying filtering processes and reducing the number of key frames (i.e., complete frames). In several embodiments, motion data is filtered using a low pass filter with a frequency that is appropriate for the desired level of smoothing of the motion curves and joint angles. In addition, relative motion between a character's feet and a surface such as a floor when foot contact is present can be removed. In many embodiments, the relative motion is removed using machine learning techniques (e.g., Support Vector Machines) to learn the situations in which the foot is expected to be locked during motion. The relative motion can be eliminated by applying an inverse kinematics correction to the motion of the feet. The editing of the motion data can be facilitated by reducing the number of keyframes on the motion curves. Although specific processes are outlined above for improving the quality of synthetic motion data, many filters and adjustments can be made in accordance with embodiments of the invention to achieve enhancements to generated character motion data as appropriate to a specific character and/or application.

Although the present invention has been described in certain specific aspects, many additional modifications and variations would be apparent to those skilled in the art. It is therefore to be understood that the present invention may be practiced otherwise than specifically described, including various changes in the implementation such as using motion models based upon meshes as opposed to markers. Thus, embodiments of the present invention should be considered in all respects as illustrative and not restrictive.

What is claimed is:

1. A run-time animation system, comprising:
   at least one processor; and
   at least one non-transitory computer readable storage medium storing instructions that, when executed by the at least one processor, cause the system to:
   receive, from a user device associated with a user, an animation to be applied to a three-dimensional character;
   identify multiple different motion models of the same animation, each of the motion models being labeled with characteristics describing the animation of the motion models;
   receive, from the user device, a user-specified magnitude of a characteristic for the animation;
   generate, on the fly and in response to receiving the user-specified magnitude of the characteristic for the animation, synthetic motion data particular to the three-dimensional character to cause the three-dimensional character to perform the animation stylized according to the user-specified magnitude of the characteristic, by:
   identifying, on the fly, salient points from each of the multiple different motion models of the same animation;
   time-warping, on the fly, portions of motion between the salient points of the multiple different motion models of the same animation to normalize the portions of motion; and
   blending, on the fly, the time-warped portions of motion from the multiple different motion models of the same animation using multi-dimensional interpolation based on the characteristics and the user-specified magnitude of the characteristic; and
   provide the synthetic motion data to the user device.

2. The animation system of claim 1, wherein the multiple different motion models of the same animation are statistical models trained using supervised learning.

3. The animation system of claim 1, wherein the multiple different motion models of the same animation include actual motion data obtained via motion capture.

4. The animation system of claim 3, wherein the actual motion data from the multiple different motion models of the same animation is obtained via marker based motion capture.

5. The animation system of claim 3, wherein the actual motion data from the multiple different motion models of the same animation includes meshes obtained using markerless motion capture.

6. The animation system of claim 1, wherein the actual motion data from the multiple different motion models of the same animation includes manually generated motion data.

7. The animation system of claim 1, further comprising instructions that, when executed by the at least one processor, cause the system to:
   receive, from the user device, a modification of the user-specified magnitude of the characteristic for the animation;
   generate, based the modified user-specified magnitude of the characteristic, updated synthetic motion data; and
   provide the updated synthetic motion data to the user device such that the user device renders the three-dimensional character doing the animation stylized according to the modified user-specified magnitude of the characteristic.

8. The animation system of claim 1, wherein the multiple different motion models of the same animation are based upon a standard model for three-dimensional characters.

9. The animation system of claim 1, further comprising instructions that, when executed by the at least one processor, cause the system to impose environmental constraints on the synthetic motion data.

10. The animation system of claim 9, further comprising instructions that, when executed by the at least one processor, cause the system to modify the synthetic motion data to constrain a certain aspect of the synthetic motion to occur during a particular period of a time base based on the environmental constraints.

11. The animation system of claim 9, further comprising instructions that, when executed by the at least one processor, cause the system to modify the synthetic motion data to prevent portions of the three-dimensional character from penetrating a floor during the animation based on the environmental constraints.

12. The animation system of claim 1, wherein the multiple different motion models of the same animation each comprises a motion data grid.

13. The animation system of claim 12, further comprising instructions that, when executed by the at least one processor, cause the system to generate synthetic motion data based on at least a motion type, a trajectory for the motion, and at least one motion styling.

14. The animation system of claim 13, wherein the characteristic for the animation is a description of a physical characteristic or an expressive characteristic of the animation.

15. The animation system of claim 13, wherein the characteristic for the animation is expressed as one of a number of discrete types of motion.

16. The animation system of claim 13, wherein the trajectory of the motion comprises a start point and an end point.

17. The animation system of claim 13, wherein the at least one motion styling is expressed using at least one value from a continuous scale that corresponds to a high level characteristic that is used to describe differences between repeated sequences of a particular motion.

18. The animation system of claim 1, wherein a time base for the multiple different motion models of the same animation is non-linear, and wherein time-warping the portions of motion between the salient points of the multiple different motion models of the same animation is based on the non-linear time base.

19. The animation system of claim 1, wherein providing the synthetic motion data to the user device comprising providing the synthetic motion data to the user device through a browser application plug-in on the user device.

20. The animation system of claim 1, wherein the generated synthetic data is realistic synthetic data based on identified motion model data of the multiple different motion models of the same animation.

21. The animation system of claim 1, further comprising instructions that, when executed by the at least one processor, cause the system to determine relationships between animation variables of the multiple different motion models of the same animation and the three-dimensional character.

22. A run-time method of animating a three-dimensional character, comprising:
    receiving, from a user device associated with a user, an animation to be applied to a three-dimensional character;
    identifying multiple different motion models of the same animation, each of the motion models being labeled with characteristics describing the animation of the motion models;
    receiving, from the user device, a user-specified magnitude of a characteristic for the animation;
    generating, on the fly and in response to receiving the user-specified magnitude of the characteristic for the animation, synthetic motion data particular to the three-dimensional character to cause the three-dimensional character to perform the animation according to the user-specified magnitude of the characteristic by blending the multiple different motion models of the same animation using multi-dimensional interpolation based on the characteristics and the user-specified magnitude of the characteristic; and
    providing the synthetic motion data to the user device.

23. The method of animating the three-dimensional character of claim 22, further comprising:
    receiving, from the user device, a modification of the user-specified magnitude of the characteristic for the animation;
    generating, based the modified user-specified magnitude of the characteristic, updated synthetic motion data; and
    providing the updated synthetic motion data to the user device such that the user device renders the three-dimensional character doing the animation stylized according to the modified user-specified magnitude of the characteristic.

24. The method of animating the three-dimensional character of claim 23, wherein the three-dimensional character is a custom three-dimensional character provided by the user device.

25. The method of animating the three-dimensional character of claim 22, wherein the multiple different motion models of the same animation are statistical models trained using supervised learning.

26. The method of animating the three-dimensional character of claim 22, further comprising:
    identifying salient points from each of the multiple different motion models of the same animation;
    time-warping portions of motion between the salient points of the multiple different motion models of the same animation to normalize the portions of motion; and
    blending the time-warped portions of the multiple different motion models of the same animation using multi-dimensional interpolation based on the characteristics and the user-specified magnitude of the characteristic.

* * * * *